United States Patent

[11] 3,564,196

| [72] | Inventors | James C. Needham<br>Saffron Walden;<br>Albert W. Carter, Stapleford, Cambridge, England |
|---|---|---|
| [21] | Appl. No. | 784,377 |
| [22] | Filed | Dec. 17, 1968 |
| [45] | Patented | Feb. 16, 1971 |
| [73] | Assignee | National Research Development Corporation<br>London, England<br>a British corporation |
| [32] | Priority | Dec. 20, 1967 |
| [33] | | Great Britain |
| [31] | | 57921/67 |

[54] MAGNETIC AMPLIFIER WELDING POWER SOURCES
9 Claims, 2 Drawing Figs.

[52] U.S. Cl. .................................................. 219/135; 323/89
[51] Int. Cl. .................................................. B23k 9/10

[50] Field of Search ........................................... 219/131, 135; 323/89, A, C

[56] References Cited
UNITED STATES PATENTS

| 2,960,626 | 11/1960 | Mulder ........................ | 323/89(A)X |
| 2,880,374 | 3/1959 | Mulder ........................ | 328/89(A)X |
| 3,286,074 | 11/1966 | Lehnert et al. ............... | 219/131 |
| 3,404,329 | 10/1968 | Sevenco ....................... | 323/89(A)X |

Primary Examiner—J. D. Miller
Assistant Examiner—G. Goldberg
Attorney—Kemon, Palmer & Estabrook ABSTRACT: A power source for arc welding includes a magnetic amplifier, the control winding of which is connected in a control circuit which compares the arc voltage with a standard reference signal. The amplifier is supplied with an alternating current having a frequency between 200 and 2,000 c.p.s. and the control winding is overdriven which results in a drooping characteristic power source having a transient response typical of a flat characteristic power source.

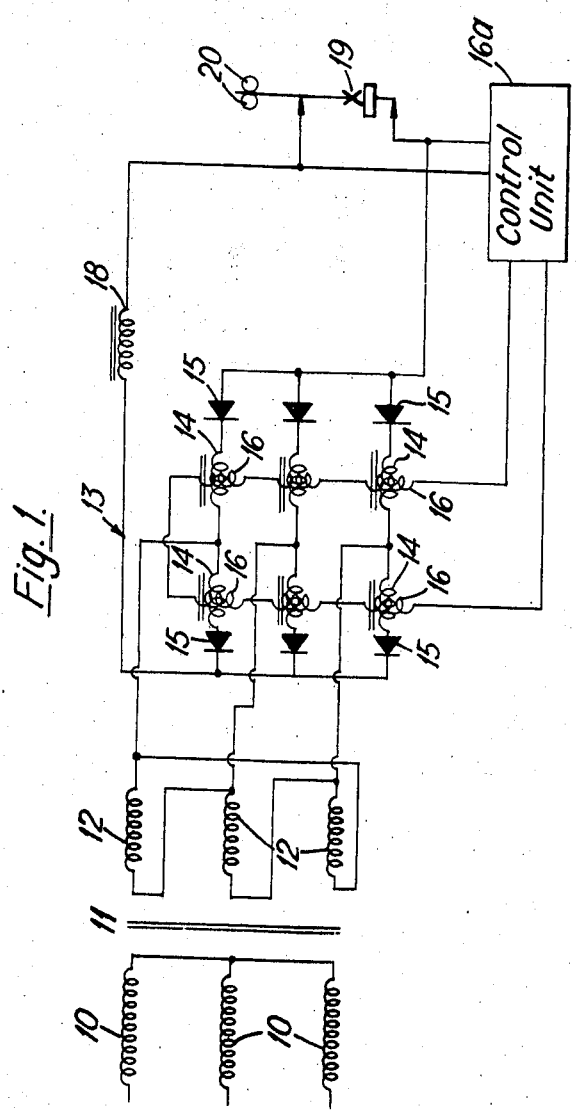

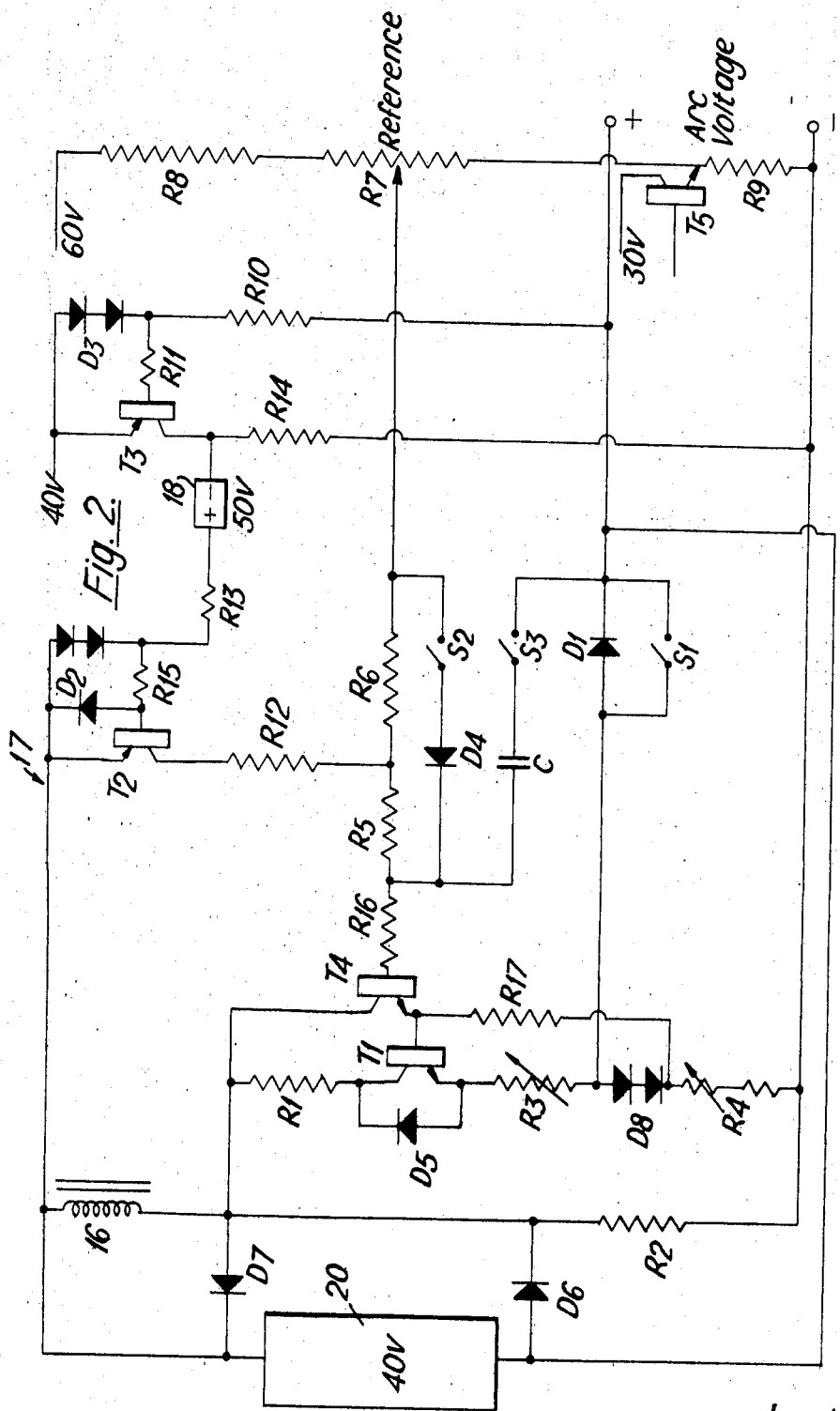

MAGNETIC AMPLIFIER WELDING POWER SOURCES

This invention is concerned with the use of power sources with drooping volt/ampere characteristics for arc welding.

In recent years, such power sources have been replaced, particularly for consumable electrode self-adjusting arc welding, by flat characteristic power sources, as the latter give a much improved degree of self adjustment. However, N.M. Buckland has shown in an article in the British Welding Journal (November 1964, p. 560) that if the drooping characteristic power source includes a magnetic amplifier, feedback applied between the output of the welding set and the control winding of the magnetic amplifier can be used to convert the drooping characteristic to a nearly flat or even rising characteristic. Buckland shows that the major part of the change in load current which occurs when there is a sudden change in load resistance occurs very rapidly (he quotes 2 milliseconds) but that the remainder of the response takes 200 milliseconds. Buckland argues that the rapid first-stage response was a characteristic of his control unit, including the feedback, and that the slow second-stage response was the response of the reactor to a future change in the control current when the system approached equilibrium. He attributes the rapid first-stage response, when the load resistance is reduced, to the application to the reactor of the full collector supply voltage of a control transistor which is turned fully on by the reduction in load voltage; the reactor control current and its core saturation level are said to be forced thereby to increase very rapidly, e.e. in the 2-millisecond period.

The fact that feedback can be used to modify the slope of the output characteristic and the claimed very rapid response suggests that the power source could be made to generate current waveforms by injecting corresponding waveforms into the feedback circuit. However, contrary to expectations based on the Buckland article, the initial fast response is not obtained when a signal is injected into the feedback circuit. From this we conclude, and we have proved by experiment, that the initial fast response obtained by Buckland is only obtained when there is a sudden change in the load which the welding equipment is supplying. This results in a transient change in output from the power source which, by transformer action, causes a corresponding change in control current. In due course, the control current returns to the original level or to any other level determined, for example, by a feedback loop. If the control or feedback system is such that the final control current is substantially of the same magnitude as the transient in control current produced by the change in load, then there is apparently no slow recovery and the response will give the impression that the control unit has a fast reaction. In fact, the transient was induced by the load and the control system itself is only capable of a relatively slow response. Time constants of the order of one-half second are involved, so that fluctuating or pulse output from the transductor-controlled welding set is not possible, except in terms of periods of 1 second or more at different current levels. Consequently, it would appear that the current waveforms produced by injecting signals into the feedback circuit would be far too slow to be of any practical use at a supply frequency of 50 c.p.s. and it would be expected from the consideration that the rapidity of the response should increase linearly with supply frequency that a supply frequency of at least 10 kc./s. would be necessary before useful waveforms could be generated from magnetic-amplifier-controlled equipment.

However, we have discovered that, irrespective of the long-term or feedback-controlled response, the transient response of a drooping characteristic magnetic-amplifier power source to a change in output load is unexpectedly of a flat nature (i.e. change of current without substantial change of voltage). That is to say, the initial response of the power source to a load transient is substantially that which would be expected from a power source having a nominally flat characteristic between open-circuit voltage and the operating point. This response then reverts to what would be expected from a drooping characteristic power source, unless the feedback is being used to modify the static drooping characteristic. This discovery has led us to the realization that useful current waveforms for arc welding can be obtained in practice with a power source of this nature operating from a supply frequency of as low as 200 c.p.s., particularly if further means are employed to enforce rapid changes in control current, apart from the effect of load changes on the control current. 400 c.p.s. is a good compromise and has the virtue of being a standard supply frequency, particularly for field-operated equipment. Also in addition to any special waveforms that may be employed such as in pulse current welding, the instantaneous response to external load changes such as short circuiting of the arc is of sufficiently flat characteristic type to serve the same purposes as normally expected from a conventional flat characteristic power source.

According to the present invention, therefore, in an arc-welding power source having a magnetic amplifier the control winding of the magnetic amplifier is connected to a control circuit receiving a reference signal and a feedback signal from the arc circuit, the feedback signal representing the arc voltage; the power source further includes means for energizing the magnetic amplifier with an alternating current having a frequency between 200 and 2,000 c.p.s. and means for applying to the control winding a driving voltage sufficient to overdrive the control winding, the magnitude of the driving voltage and the frequency of the alternating current being such that the time constant of the rate of change of the current in the control winding is less than one-tenth second and preferably less than one one-hundredth second.

In order that the invention may be better understood, one example will now be described with reference to the accompanying drawings, in which:

FIG. 1 shows a power source of the kind to which the invention relates; and

FIG. 2 illustrates a control circuit for use with the apparatus for FIG. 1.

In FIG. 1 there is shown a three-phase supply connected in star form to the primary windings 10 of a transformer 11. The secondary windings 12 of this transformer are interconnected in delta fashion and are connected through the windings 14 of a magnetic amplifier 13 to a three-phase fullwave rectifier consisting of the rectifying elements 15. The magnetic amplifier also has for each winding 14 a control winding 16, the six control windings being connected in series across the output of a control unit 16a.

The output of the rectifying system is applied, in this case through an inductance 18, to the arc 19. In this example the arc is being fed with a consumable electrode by rolls 20.

For convenience, the six series-connected control windings are represented in FIG. 2 by a single winding 16 but it should be remembered that the control circuit of FIG. 2 energizes all six windings simultaneously. The control windings can be wound so that full control current can be obtained with 10 volts applied. Then, to achieve higher rates of response, a considerably higher voltage, such as 50 or 60 volts, is applied to the control winding. In FIG. 2, the resistor $R_1$ limits the maximum control current passing through the winding 16 when the transistor $T_1$ is conducting. A resistor $R_2$ controls the minimum value of the control current when the transistor $T_1$ is nonconducting. Variable resistors $R_3$ and $R_4$ are connected in the emitter circuit of transistor $T_l$. An emitter follower transistor $T_4$ is a driving transistor for $T_1$. The base of transistor $T_4$ is connected through resistors $R16$, $R_5$ and $R_6$ to a potentiometer $R_7$ in series with resistors $R_8$ and $R_9$. A modulating waveform is applied to the base of an emitter follower transistor $T_5$ so that the waveform is injected across resistor $R_9$ to cause a corresponding modulation at the base of transistor $T_1$. The lower end of the resistor $R_3$ is connected through a diode $D_1$ (in parallel with a switch $S_1$) to the positive side of the arc voltage, the negative side of the arc voltage being connected to the lower end of resistor $R_4$. For convenience, the power supply 20 to the control winding 16 is connected in series with the welding equipment output so that a higher H.T.

supply is available to serve with higher arc voltages. Thus, the current passed by transistor $T_1$ depends upon the difference between the instantaneous value of the modulation applied to the base and the arc voltage applied to its emitter. As an example, in pulsed transfer welding the reference voltage may be modulated, using for example a multivibrator feeding resistor $R_9$ by way of the emitter follower $T_5$ between two or more levels so as to modulate the output current, through the medium of the transductor control winding, in a corresponding manner. Thus, with a supply frequency of only 400 c.p.s. and with an excess driving voltage for the control winding of about 50 volts, we are able to obtain useful waveforms for pulse transfer welding with a repetition frequency of the order of 40 per second. The resistor $R_3$ in the emitter circuit provides a more positive control of the magnitude of the pulse current. It also makes the fluctuations in the arc voltage relatively less significant and requires a larger modulation of the base reference waveform. Resistor $R_2$ also serves as a stabilizing means since otherwise the minimum current with fluctuations in arc voltage might fall to such a level that the arc becomes unstable or even extinguishes.

For the operation described, namely pulsed-current metal-inert gas welding switch $S_1$ is closed to eliminate the diode $D_1$ and switches $S_2$ and $S_3$ are open. Switch $S_3$ may be closed, if desired, to provide some positive feedback from the arc voltage to compensate for the fact that the arc voltage rises with increase in current during the pulse.

The circuit shown in FIG. 2 also makes provision for the control winding to be fully on prior to starting a weld so that the maximum output is available to clear the initial contact of the electrode with the workpiece. For this purpose, the transistor $T_1$ is biased into full conduction prior to starting, the extra bias being removed once the arc is established. In the circuit shown, a transistor $T_3$ is connected through its base resistors $R_{10}$ and $R_{11}$ to the positive side of the arc voltage and its emitter is connected to a 40 volt supply. Diodes $D_3$ protect the base of transistor $T_3$ when it is fully on. The transistor $T_3$ is turned off when the output voltage exceeds 40 volts. The collector of transistor $T_3$ is connected through a 50 volt biasing source 18 and resistors $R_{13}$ and $R_{15}$ to the base of a transistor $T_2$. The transistor $T_2$ is turned on when the transistor $T_3$ turns off and the collector voltage of transistor $T_2$ rises and, through resistor $R_{12}$ and transistor $T_4$, turns on transistor $T_1$. When the output voltage falls to normal arc voltage levels or to a short circuit value, transistor $T_3$ is turned on again and transistor $T_2$ is turned off. This in turn isolates transistor $T_1$ from the above-described arrangements for initially biasing it into conduction.

For spray transfer welding with a consumable electrode the output from the welding equipment can be adjusted conveniently by means of the reference voltage, as shown in FIG. 2, but without the modulation which was used for pulsed current operation. However, it may be convenient to introduce a limited degree of modulation to give a more regular metal transfer than would otherwise be obtained. To stabilize the transfer in this manner, a moderate current modulation with an excursion of for example 50 amperes is generally sufficient. The high-output condition for the start of welding is used in the manner described above. As soon as the arc is established the control current due to the network including the transistors $T_2$ and $T_3$ is effectively cut off and the operation is then governed by the control transistor $T_1$.

When covered electrodes are used, a relatively steeply drooping supply is needed so that the current does not fluctuate excessively with change in operating arc lengths or arc voltage. This can be provided by a resistor in parallel with the minimum current resistor $R_2$ to give a preset control current. However, for the intermittent short circuits which occur in covered electrode welding, the short circuit current available would not be sufficient to clear the short circuits, although at the first instant of short circuiting there is an overcurrent due to the change in output loads presented by the short circuit. With the high-speed response the overcurrent is rapidly corrected to the previous arc current level and this is undesirable because the electrode tends to "freeze" to the workpiece. Consequently, we prefer to effect the control by means of a transistor so arranged that the operating current is increased during short circuits. In the example shown, a fixed reference of, for example, 25 volts is applied to the base of transistor $T_1$ from the potentiometer 7 and resistor $R_4$ is used to control the operating current. When there is a short circuit, the resistor $R_4$ is bypassed by diode $D_1$, contact $S_1$ being open at this time. Consequently, a higher control current, determined by resistor $R_3$, is obtained. The output current rises with a rapid transient at the instant of short circuiting and is maintained at the increased level governed by resistor $R_3$ for the duration of the short circuit. When the short circuit breaks and the arc voltage becomes greater than about 20 volts, the potential on the diode $D_1$ is reversed and consequently the current returns to the original level, as determined by the resistor $R_4$.

With the circuit shown, the operating current is in fact additionally increased immediately following the rupture of a short circuit by boosting the reference voltage for a short period. This is achieved by means of the RC circuits consisting of the capacitor C and the resistors $R_5$ and $R_6$, the contacts $S_2$ and $S_3$ being closed at this time. The diode $D_4$ prevents a negative transient being applied to the reference supply when the arc voltage falls but when the short circuit breaks the rise to arcing voltage is added to the reference supply as a decaying exponential transient. The time constant in the reference supply can be adjusted as desired and may conveniently be in the range of 0.1 to 0.01 seconds, for example 0.03 seconds.

Other modifications can be made to the circuit to adapt it for other forms of welding, for which in general switch $S_1$ will be closed. For short circuit welding with a consumable electrode it is desirable to limit either the rate of rise of current on short circuiting or its maximum level or both and similarly during arcing it is desirable to limit the rate of fall of current and its minimum level. To control the instantaneous current rise on short circuiting, a small inductance can be added in series with the welding equipment. Such a small inductance is shown in FIG. 1 and for short circuit welding with a consumable electrode its value would be of the order of 0.1 to 0.5 mh. To restrict the overall current rise to maximum, the reference voltage can be decreased using a similar time constant to that shown in FIG. 2 but with switch $S_2$ open. For small diameter wires, such as those having a diameter of one thirty-second inch, a time constant of 0.01 second or less is preferred. The instantaneous increase in current on short circuiting then reverts back towards the operating current prior to short circuiting since both the emitter and base voltages decrease together. With suitable adjustment of resistors $R_5$ and $R_6$ and capacitor C, it can be arranged that the output current is falling at the period of short circuit break (unlike conventional short circuit arc welding) so that the tendency to spatter is greatly reduced. However, if any one short circuit fails to be cleared then due to the decay of the transient in the reference supply, the control current and hence the output increases until the short circuit is interrupted.

It must be emphasized that these circuits take advantage of the rapid response which can be obtained owing to the flat transient response of a drooping characteristic power source and by overdriving the control winding and using for the power source an energizing frequency of at least 200 c.p.s. Moreover, the current output for a given load can be set at limits above and below the minimum and maximum current respectively, using a suitable reference and feedback loop. For example, for a given load if the maximum available output is 500 amps. the reference can be set to give, for example, an output at a first level of 200 amps. and at other times an output at a second level of 100 amps. The transition from 100 amps. to 200 amps. and back owes its rapidity to the flat transient response of the power source, the overdriving of the control winding with a relatively high supply voltage and the increased energizing frequency. As soon as the desired current is reached, the gate constituted by the transistor is partially closed and the control current is held at the required level, which is less in the example described than the maximum level determined by the resistor $R_1$. In a similar way, the lower current is higher than that determined by the limiting resistor $R_2$.

Although we have shown a transistor in series with the limiting resistor $R_1$, it will be appreciated that the transistor can be replaced by some other form of switch, for example an electrical or mechanical commutator system.

The transistor shown as $T_1$ may comprise more than one transistor operating in parallel with the collector and emitter resistances modified accordingly. Also, depending on the voltage rating of the transistor, additional protection can be provided, such as a diode $D_5$, to prevent a reverse voltage between the collector and emitter. Similarly, diodes $D_6$ and $D_7$ prevent excessively low and high transient voltages developing across the control winding.

The emitter resistance $R_{17}$ of the driving transistor $T_4$ is connected to the lower end of two diodes $D_8$ to provide a bias in the emitter supply.

Transistors $T_2$ and $T_3$ may be of the kind designated OC36. The remaining transistors may be of the kind BDY 11.

I claim:

1. A power source for supplying electrical power to a welding arc, comprising:
    a magnetic amplifier including a control winding;
    a control circuit connected to said control winding;
    feedback means connected to the arc and to said control circuit and supplying to said control circuit a signal proportional to arc voltage;
    a reference signal source connected to said control circuit and supplying thereto a reference signal for comparison with the arc voltage;
    means for energizing said magnetic amplifier with an alternating current having a frequency between 200 and 2,000 c.p.s.
    means for applying to said control winding a driving voltage for overdriving said control winding: and
    the magnitude of said driving voltage and the frequency of said alternating current being such that the time constant of the rate of change of control current in the control winding is less than one-tenth of a second.

2. An arc welding power source in accordance with claim 1, in which said reference signal source includes means for modulating the reference signal.

3. An arc welding power source in accordance with claim 1 including means responsive to the transient rise in the output current, when a short circuit occurs, to reduce the resistance in the circuit of said control winding thereby to increase the current flow through said control winding.

4. An arc welding power source in accordance with claim 1, in which the time constant of the rate of change of control current is less than one one-hundredth second.

5. An arc welding power source in accordance with claim 1, in which said control circuit includes an electrical resistance, connected in series with said control winding, and switching means for short circuiting said resistance to reduce the impedance in series with said control winding and thereby to increase the current through said control winding.

6. An arc welding power source in accordance with claim 5 further including a circuit responsive to the arc voltage to cause said switching means to short circuit said electrical resistance prior to the initiation of the arc.

7. An arc welding power source in accordance with claim 5, in which said switching means is a transistor having its emitter-collector path in parallel with the said resistor.

8. An arc welding power source in accordance with claim 7, in which said transistor in said control circuit is so connected to said reference signal source and to said feedback circuit supplying the arc-representative voltage that the base-emitter potential of said transistor varies in accordance with the difference between the reference signal and the arc voltage.

9. An arc welding power source in accordance with claim 7 including a capacitor connected to apply the arc voltage transient to the base of said transistor.